(12) United States Patent
Carroll

(10) Patent No.: US 9,949,309 B2
(45) Date of Patent: Apr. 17, 2018

(54) METHODS, COMPUTER READABLE MEDIUMS, AND APPARATUSES FOR PROVIDING COMMUNICATION TO A MOBILE DEVICE USING VIRTUAL CONNECTIONS

(75) Inventor: Caleb Carroll, Cochrane (CA)

(73) Assignee: NOMAD SPECTRUM LIMITED, Newcastle Upon Tyne (GB)

( * ) Notice: Subject to any disclaimer, the term of this patent is extended or adjusted under 35 U.S.C. 154(b) by 572 days.

(21) Appl. No.: 14/000,279

(22) PCT Filed: Feb. 17, 2012

(86) PCT No.: PCT/GB2012/000173
§ 371 (c)(1),
(2), (4) Date: Aug. 19, 2013

(87) PCT Pub. No.: WO2012/110771
PCT Pub. Date: Aug. 23, 2012

(65) Prior Publication Data
US 2013/0336275 A1    Dec. 19, 2013

(30) Foreign Application Priority Data

Feb. 19, 2011 (GB) .................................. 1102927.9
Feb. 19, 2011 (GB) .................................. 1102928.7

(51) Int. Cl.
| | |
|---|---|
| *H04W 76/02* | (2009.01) |
| *H04L 12/741* | (2013.01) |
| *H04W 88/02* | (2009.01) |
| *H04W 92/00* | (2009.01) |
| *H04W 88/00* | (2009.01) |

(52) U.S. Cl.
CPC .......... *H04W 76/025* (2013.01); *H04L 45/54* (2013.01); *H04W 88/005* (2013.01); *H04W 88/02* (2013.01); *H04W 92/00* (2013.01)

(58) Field of Classification Search
CPC ... H04W 76/025; H04W 88/02; H04W 92/00; H04W 36/32; H04W 84/18; H04W 88/08; H04L 45/54
See application file for complete search history.

(56) References Cited

U.S. PATENT DOCUMENTS

| | | | |
|---|---|---|---|
| 5,535,195 A | * | 7/1996 | Lee .......................... H04L 45/02 370/256 |
| 5,940,381 A | * | 8/1999 | Freeburg ............ H04Q 11/0478 370/310.1 |
| 7,006,444 B1 | | 2/2006 | Stone |

(Continued)

FOREIGN PATENT DOCUMENTS

| | | |
|---|---|---|
| EP | 0544465 A2 | 6/1993 |
| GB | 2462910 A | 3/2010 |

(Continued)

*Primary Examiner* — Hoang-Chuong Q Vu
(74) *Attorney, Agent, or Firm* — Terry M. Sanks, Esq.; Beusse Wolter Sanks & Maire, PLLC

(57) ABSTRACT

A method of providing connectivity to a device having N communication interfaces and M virtual connections, each interface being connectable to a further device. The method comprises determining, for each of the interfaces, a characteristic of the interface. Respective ones of the M virtual connections are associated with respective ones of the N interfaces based upon the determined characteristics.

16 Claims, 9 Drawing Sheets

(56) References Cited

U.S. PATENT DOCUMENTS

| | | | | |
|---|---|---|---|---|
| 7,327,683 | B2* | 2/2008 | Ogier | H04L 1/1614 370/236 |
| 7,453,824 | B1* | 11/2008 | Nucci | H04J 14/0227 370/254 |
| 7,792,987 | B1* | 9/2010 | Vohra | H04L 12/4633 370/237 |
| 8,705,527 | B1* | 4/2014 | Addepalli | H04W 4/046 370/389 |
| 2002/0039367 | A1* | 4/2002 | Seppala | H04W 8/065 370/401 |
| 2003/0026209 | A1* | 2/2003 | Katz | H04L 12/42 370/238 |
| 2003/0128706 | A1* | 7/2003 | Mark | H04L 12/2852 370/395.1 |
| 2003/0182419 | A1* | 9/2003 | Barr | H04W 36/06 709/224 |
| 2003/0224758 | A1 | 12/2003 | O'Neill et al. | |
| 2004/0059828 | A1* | 3/2004 | Hooper | H04L 12/5693 709/238 |
| 2005/0060535 | A1* | 3/2005 | Bartas | H04L 63/145 713/154 |
| 2006/0182101 | A1 | 8/2006 | Hoekstra et al. | |
| 2006/0193295 | A1* | 8/2006 | White | H04L 12/5692 370/336 |
| 2007/0255848 | A1* | 11/2007 | Sewall | H04L 29/12066 709/232 |
| 2008/0205271 | A1* | 8/2008 | Aissaoui | H04L 12/66 370/235 |
| 2008/0313327 | A1* | 12/2008 | Sewall | H04L 12/287 709/224 |
| 2009/0097620 | A1* | 4/2009 | Kim | H04M 3/53333 379/88.17 |
| 2009/0147692 | A1* | 6/2009 | Hasan | H04L 41/5009 370/252 |
| 2010/0027419 | A1* | 2/2010 | Padhye | H04L 5/0037 370/235 |
| 2010/0272110 | A1* | 10/2010 | Allan | H04L 45/02 370/395.53 |
| 2011/0134802 | A1* | 6/2011 | Rajagopalan | H04L 45/48 370/256 |
| 2011/0286418 | A1* | 11/2011 | Liu | H04L 45/125 370/329 |
| 2011/0305166 | A1* | 12/2011 | Ootani | H04W 48/20 370/254 |
| 2012/0008527 | A1* | 1/2012 | Le | H04W 48/08 370/254 |

FOREIGN PATENT DOCUMENTS

| | | |
|---|---|---|
| JP | 2004112380 A | 4/2004 |
| WO | 0251093 A2 | 6/2002 |
| WO | 2004109431 A2 | 12/2004 |
| WO | WO 2007/063168 A1 | 6/2007 |
| WO | 2008108695 A1 | 9/2008 |
| WO | 2010005786 A1 | 1/2010 |

* cited by examiner

METHODS, COMPUTER READABLE MEDIUMS, AND APPARATUSES FOR PROVIDING COMMUNICATION TO A MOBILE DEVICE USING VIRTUAL CONNECTIONS

The present invention relates to a method of providing data communication to a moving object such as a vehicle.

Computers are commonplace in modern society. Many computers are now connected to a worldwide network known as the Internet which allows computers to exchange data with one another. In particular, users can use computing devices to access the worldwide web which provides a vast quantity of information which can be downloaded to a user's computer.

With the increased portability of computers, and the increasing sophistication of mobile devices such as mobile telephones and palmtop computers, there is a growing demand for Internet connectivity while on the move. One response to this demand is based upon devices having built-in long-range telecommunications capabilities, such as devices which make use of mobile telephone networks. While such solutions can be effective, they typically suffer from problems of low bandwidth and incomplete geographic coverage. The problem of low bandwidth is a particular issue when a user wishes to access content comprising a large quantity of data (for example video content). The problem of incomplete geographic coverage is particularly problematic when a user is moving, given that data communication may be interrupted when a signal is lost (for example when a train enters a tunnel).

An alternative method of providing Internet connectivity to mobile devices is based upon the use of access points. Such access points may be provided, for example, in public buildings such as libraries and cafes, and can be accessed by mobile computing devices which are located within a predetermined range of the access point. One common technology used to allow mobile computing devices to connect to such access points is specified by IEEE standard 802.11, and is commonly referred to as WiFi. The use of access points in this way is advantageous in that it allows higher bandwidth connections to be established.

The limitations of systems based upon the connection of mobile devices to mobile telephone networks has led to the proposal that public transport vehicles, such as trains or buses, may be beneficially provided with wireless access points, such that mobile computing devices used by passengers traveling in the vehicle can be provided with Internet connectivity.

The provision of Internet connectivity to a vehicle can be specially tailored to cope with the routes traveled by the vehicle, such as through tunnels and cuttings. More power is available on the vehicle than on a mobile computing device, meaning that systems fitted to vehicles can generally support larger, higher gain antennas than those that are generally installed in portable user devices such as mobile telephones. Furthermore, greater computational power can be used in signal processing in a device associated with a vehicle given that there is room for larger, more powerful processing devices.

Different types of communication links can be used to provide data communication to a vehicle, separately or together, appropriate to the locations through which the vehicle travels. Furthermore, if a vehicle's route is known, the communication links can be managed to provide a higher level of service with greater bandwidth, lower latencies, and fewer losses of connection than if the communications were made directly to individual users using a mobile telephone network. It follows that the provision of a wireless access point on board a vehicle has considerable advantages. Such provision does, however, bring challenges.

It is known to place a number of base stations along a known route, for example alongside a train track. It is further known to connect each base station to a home server via appropriate connections, for example land-based cables. The home server may be connected to the Internet via standard means, for example via cable or via a digital subscriber line (DSL). A communication control unit is placed on the vehicle. As the vehicle travels along the route, the communication control unit wirelessly connects to a particular base station. In this way, the communication control unit can connect to the Internet through the home server, routed via the base stations and any intermediate devices in the network. The communication control unit is adapted to distribute the Internet connection to devices within the vehicle, allowing users to connect to the Internet whilst onboard the vehicle.

Known systems, however, suffer from performance disadvantages through their failure to make most effective use of available resources, such as base stations.

There is therefore a need for methods of providing data communications to a moving object, such as a vehicle, that provide improved performance.

It is an object of embodiments of the invention to obviate or mitigate at least some of the problems outlined above.

According to a first aspect of the present invention, there is provided a method of providing connectivity to a device having N communication interfaces and M virtual connections, each interface being connectable to a further device the method comprising: determining, for each of the interfaces, a characteristic of the interface; associating respective ones of the M virtual connections with respective ones of the N interfaces based upon the determined characteristics.

In this way, a device with a plurality of communication interfaces may efficiently utilize a plurality of virtual connections for communication with further devices, thereby making efficient use of available resources.

The characteristic of the interface may be based upon whether the interface is connected to a further device.

The characteristic of the interface may be based upon a characteristic of a connection between the interface and a further device.

The method may further comprise establishing a connection between one of the interfaces and one of a plurality of further devices.

The method may further comprise selecting one of the plurality of further devices with which a connection is to be established based upon a respective characteristic associated with the plurality of further devices.

The respective characteristic may represent a signal strength of connection between the device and the plurality of further devices.

Each of the virtual connections may be a connection between the device and a host device (sometimes referred to herein as a home agent) and communication is provided between the device and the host device via the further device. The host device may be adapted to provide communication between the device and a predetermined network, such as the Internet.

All of the M virtual connections may be associated with a single one of the N interfaces, or alternatively, each of the M virtual connections may be associated with a respective one of the N interfaces. The M virtual connections may be distributed evenly among the N interfaces, or clustered among a subset of the N interfaces. That is, the M virtual connections may be distributed amongst the N interfaces in any way.

The M virtual connections may be communication tunnels.

N and M may be equal positive integer numbers.

The device may be aboard a vehicle. The device may be arranged for connection with one or more client devices (e.g. computing devices such as laptops, mobiles telephones, PDAs and so on) by wired or wireless means. For example the device may act as a wireless access point.

A data packet to be transmitted from the device may be assigned to one of the M virtual connections based upon an attribute of that data packet, for example, a destination of the data packet.

According to a second aspect of the present invention, there is provided a method of communicating with a device having N communication interfaces and M virtual connections, each interface being connectable to a further device, the method comprising: receiving a first data packet through one of the M virtual connections, the first data packet comprising an indication of a first time and an indication of a first further device; associating the first further device with the one of the M virtual connections; receiving a second data packet through the one of the M virtual connections, the second data packet comprising an indication of a second time and an indication of a second further device; associating the second further device with the one of the M virtual connections if, but only if, the second time is later than the first time; and transmitting a third data packet to the first device using the one of the M virtual connections and the further device associated with the one of the M virtual connections.

According to a third aspect of the present invention, there is provided a method of providing communication to a first device. The method comprises establishing a plurality of connections, each connection being between a first device and one of a plurality of second devices. Establishing a plurality of virtual connections, each virtual connection being between said first device and one of a plurality of third devices through one of said second devices. Selecting one or more of said virtual connections based upon data indicating characteristics of said virtual connections.

It may be that the most appropriate third device with which to establish a virtual connection when connected to one of the second devices, may not be the most appropriate third device with which to establish a virtual connection when connected to another of the second devices. The third aspect overcomes this problem by making available a plurality of third devices amongst which the first device can select. As the first device connects to different ones of the second devices, the first device can select the most appropriate third device based upon characteristics of connections between each second device and each of the third devices.

The characteristics of the virtual connections may comprise a parameter associated with communication using the virtual connections.

The parameter may be indicative of properties of a link between one of the second devices and one of the third devices.

The data may provide an indication of a round trip time for data sent using each of said virtual connections.

Each of the virtual connections may be a communication tunnel.

The method may further comprise storing a routing table comprising a plurality of entries, each entry associating particular routing data with a particular virtual connection.

The method may further comprise receiving a data packet comprising routing data, and processing the received data packet with reference to the routing table to obtain a virtual connection associated with the routing data.

The method may further comprise determining whether the obtained virtual connection is one of the one or more selected virtual connections.

If the obtained virtual connection is not one of the one or more virtual connections, the method may comprise obtaining another of the virtual connections, the other of the virtual connections being one of the one or more selected virtual connections.

Another of the virtual connections may be obtained if but only if the obtained virtual connection is not in use.

The method may further comprise terminating use of a particular virtual connection if a time out time is reached.

The first device may be aboard a vehicle.

The first device may be arranged to receive data packets from client devices.

The first device may be arranged to wirelessly receive data packets from client devices.

It will be appreciated that aspects of the present invention can be implemented in any convenient way including by way of suitable hardware and/or software. For example, a device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

An embodiment of the invention will now be described, by way of example, with reference to the accompanying drawings, in which.

Figure 1:
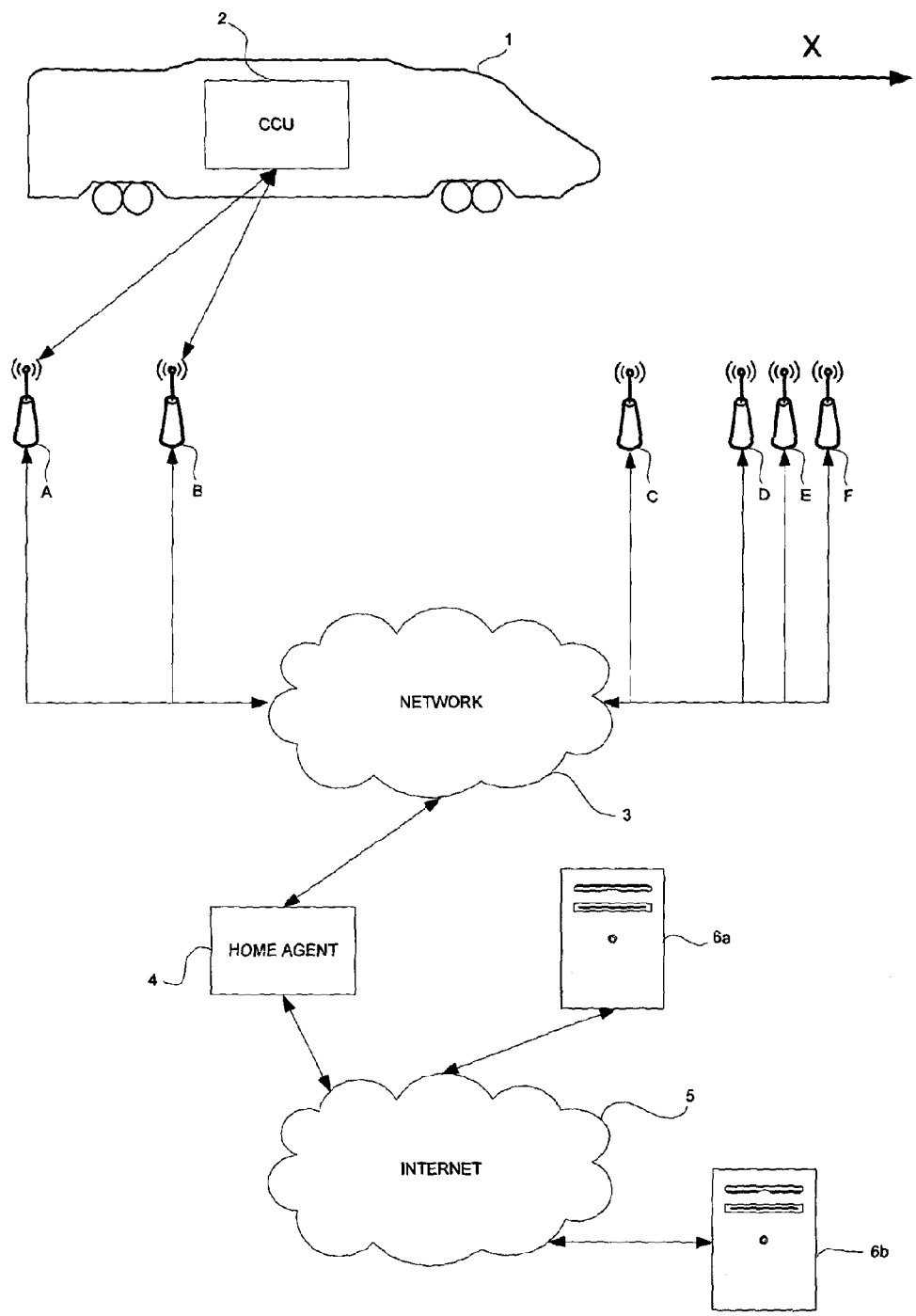
FIG. 1 is a schematic illustration of a network of computing devices.

FIG. 1 shows a network which is used to provide data communication to a train 1. The train 1 is provided with a communications control unit (CCU) 2 which is arranged to connect to base stations A to F, each of which are connected to a network 3. Both the CCU 2 and the base stations A to F are provided with wireless communications interfaces to allow a wireless connection to be established between the CCU 2 and the base stations A to F. A home agent 4 is also connected to the network 3. Virtual communication tunnels are established between the CCU 2 and the home agent 4, using data packet encapsulation, so as to allow data packets to be securely exchanged between the CCU 2 and the home agent 4.

It will be appreciated that while FIG. 1 shows each of the base stations A to F directly connected to a single network 3, each base station A to F may be connected to one or more further networks which are in turn connected to the network 3. For example, the base station A may be connected to a 3G cellular network, while the base station B may be connected to an IEEE 802.16 (WiMax) network, each of which may be connected to the network 3. Further, while the Internet 5 and the network 3 are shown separately in FIG. 1, the network 3 may be connected to, and may at least partly include, the Internet 5.

The home agent 4 is connected to the Internet 5. Host computers 6a, 6b are also connected to the Internet 5. The connection of the CCU 2 to the home agent 4 through a communication tunnel means that from the point of view of computers connected to the Internet 5 (for example the host computers 6a, 6b), all traffic is seen to emanate from the home agent 4, such that computers connected to the Internet 5 need not be concerned with details of the communication between the home agent 4 and CCU 2. Instead, computers connected to the Internet 5 can simply deliver data packets to the home agent 4 which can then process received data packets to ensure that such data packets are properly forwarded to the CCU 2.

The CCU 2 is arranged to provide wireless network connectivity on board the train 1. In this way passengers travelling on the train 1 can use mobile computing devices (such as laptop and palmtop computers, for example) to connect to the CCU 2 and thereby obtain access to the Internet 5. The connection between the mobile computing devices and the CCU 2 can take any suitable form, but may be in accordance with IEEE standard 802.11 (WiFi).

As the train 1 moves in the direction shown by the arrow X, the CCU 2 connects to different ones of the base stations A to F. Each base station A to F has a finite area within which it can receive and transmit data, and it is preferred that the finite areas overlap, such that there is a time during travel of the train during which the train is able to communicate with more than one of the base stations A to F. In FIG. 1, the train 1, and therefore the CCU 2 is within the signal range of both of the base stations A, B and is connected to both of the base stations A, B.

Figure 2:
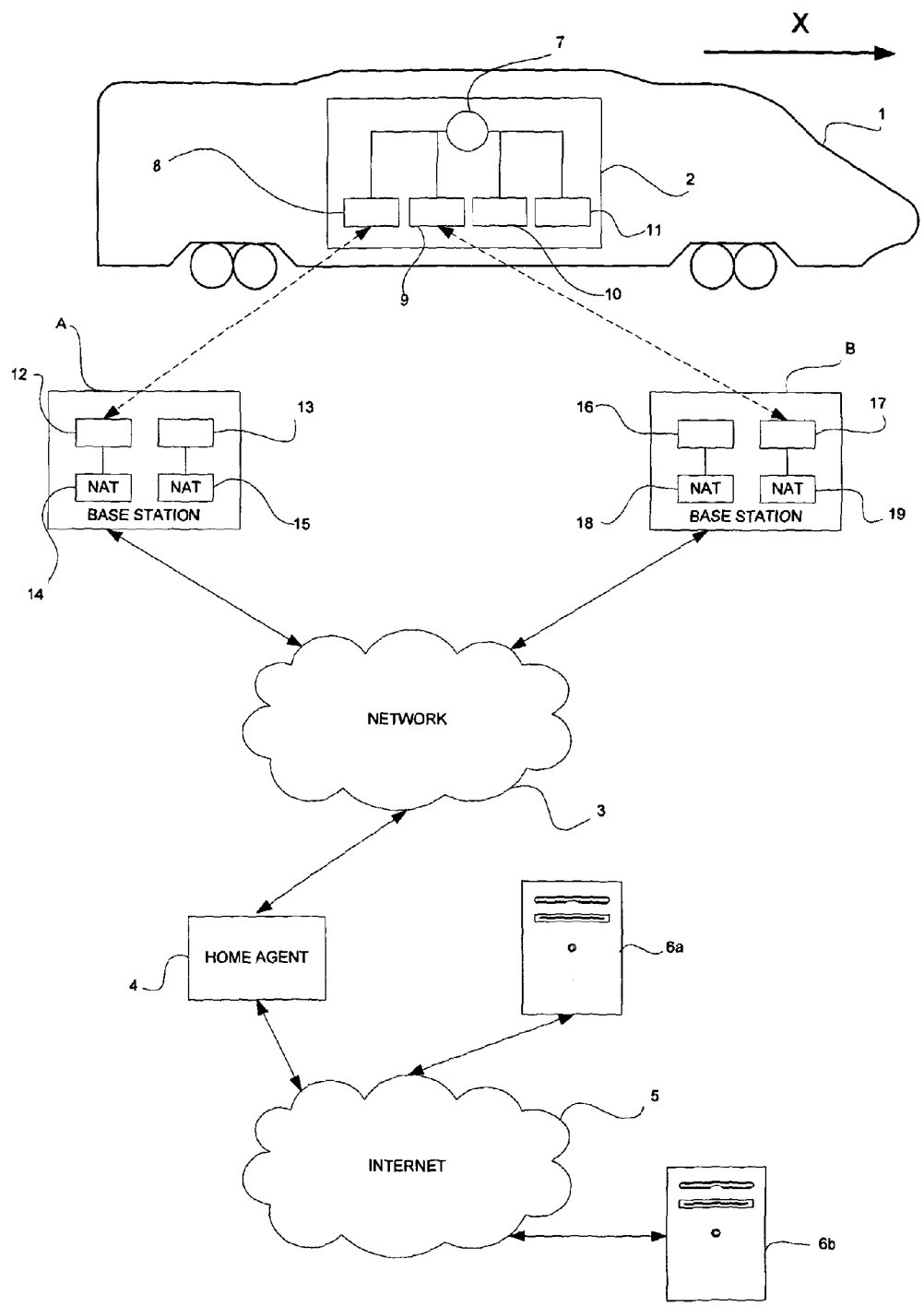
FIG. 2 is a schematic illustration showing components of the network of FIG. 1 in further detail.

FIG. 2 shows the network of FIG. 1, in which some components are shown in further detail. More particularly, it can be seen that the CCU 2 comprises a router 7 connected to four communication interfaces 8, 9, 10, 11. In the present embodiment, communication interfaces 8, 9, 10, 11 take the form of wireless bridges. Each of the wireless bridges 8 to 11 is arranged to transmit data at a respective frequency (which may be a predefined frequency, or may be a frequency which is selected when a connection using that wireless bridge is established). The CCU 2 is also provided with the ability to establish four communication tunnels between the CCU 2 and home agent 4. It will be appreciated that a CCU 2 may be provided with other numbers of wireless bridges, and/or other numbers of communication tunnels between the CCU 2 and the home agent 4, as appropriate.

The provided communication tunnels are distributed amongst the four wireless bridges 8, 9, 10, 11 which have a current connection with a base station. That is, communication tunnels are not distributed to wireless bridges not having a current connection with a base station, such that each communication tunnel is associated with a wireless bridge having a current connection with a base station, thereby rendering all communication tunnels operable.

The base station A is provided with two wireless bridges 12, 13, the wireless bridge 12 being arranged to transmit and receive data at a first frequency while the wireless bridge 13 is arranged to transmit and receive data at a second frequency. It will be appreciated that the first and second frequencies may be predetermined, fixed, frequencies, or alternatively, the wireless bridges 12, 13 may be adapted to select respective first and second frequencies upon establishment of a connection. For example, establishment of a connection between one of the wireless bridges 12, 13 and one of the wireless bridges 8 to 11 may initiate a handshake process by which the respective first and second frequencies are determined. The base station A further comprises two network address translation (NAT) devices 14, 15, such that the NAT device 14 is connected to the wireless bridge 12, while the NAT device 15 is connected to the wireless bridge 13.

The base station B is configured similarly to the base station A. More specifically, the base station B comprises two wireless bridges 16, 17 respectively arranged to transmit and receive data at different frequencies, and each of the wireless bridges 16, 17 is connected to a respective NAT device 18, 19. The NAT devices 14, 15, 18, 19 may be, for example, NAT capable network switches, such as a DI-604 available from D-Link Corporation, Taipei, Taiwan.

In FIG. 2, the wireless bridge 8 of the CCU 2 is connected to the wireless bridge 12 of the base station A, while the wireless bridge 9 of the CCU 2 is connected to the wireless bridge 17 of the base station B. Two of the four communication tunnels between the CCU 2 and the home agent 4 are assigned to the wireless bridge 8 while the remaining two of the four communication tunnels are assigned to the wireless bridge 9. In this way, the CCU 2 can transmit data packets to each of the base station A and the base station B, and thereby increase the bandwidth available for communication with the home agent 4.

Referring again to FIG. 1, as the train 1 moves in the direction of the arrow X, the strength of the signal at the CCU 2, first from the base station A, and then from the base station B will decrease, while the CCU 2 will move into the signal range of other base stations C, D, E, F. At a time when the CCU 2 is within range of the base stations A, B and C, the strength of the signal from the base stations A and C is comparable and relatively weak, while the signal from the base station B is relatively strong. In this case, the CCU 2 connects to all three of the available base stations A, B, C. For example, the bridge 8 of the CCU 2 may remain connected to the bridge 12 of the of the base station A, and the bridge 9 of the CCU 2 may remain connected to the bridge 17 of the base station B, while the CCU 2 establishes a connection between the bridge 10 of the CCU 2 and a free wireless bridge of the base station C. Upon connection with the base station C, one or more of the four communication tunnels between the CCU 2 and the home agent 4 are transferred to the wireless bridge connected to the bridge 10.

It will be appreciated that allocation of communication tunnels amongst the bridges 8 to 11 may be carried out in any convenient way. For example, communication tunnels may be distributed evenly (or as close to evenly as is possible) between the wireless bridges 8 to 11. Alternatively, communication tunnels may be assigned to respective ones of the wireless bridges 8 to 11 of the CCU 2 based upon relative signal strengths of connections or potential connections with respective base stations A to F and/or the amount of data currently being received/sent by the respective wireless bridges. For example, a single communication tunnel may be transferred from the wireless bridge 8 to the wireless bridge 10, leaving the wireless bridge 9 (having a relatively strong connection with the base station B) with two of the four communication tunnels. As the train 1 continues to move in the direction of the arrow X, the signal strength from the base station A decreases below a usable or predetermined limit with no further base stations being in range of the CCU 2, such that the remaining communication tunnel assigned to the wireless bridge 8 is transferred to the wireless bridge 10 which is connected to the base station C.

Referring again to FIG. 1, it can be envisaged that there may be a time at which the train will be within range of each of the base stations C, D, E, F. At this time, each of the wireless bridges 8 to 11 will connect to a respective one of the base stations C, D, E, F and each of the four communication tunnels will be assigned to a respective one of the wireless bridges 8 to 11. That is, each wireless bridge 8 to 11 will be assigned a single communication tunnel.

Tunnels may further be assigned based upon a measure of a cost of service of using a particular base station. For example, sending and receiving data packets via a base station in one location connected to a particular 3G network may incur a relatively high cost compared with the sending and receiving of a base station in a different location connected to the same 3G network. In this case, it may be desirable to preferentially allocate tunnels to particular wireless bridges 8 to 11 based upon a measure of the cost of using the base station to which that wireless bridge is connected.

Although details of the connection between the home agent 4 and the CCU 2 need not be considered by computers connected to the Internet 5, it will be appreciated that the home agent 4 needs to be able to properly route data packets to and from the CCU 2, as the CCU 2 connects to different base stations along the route of the train 1. One known method for determining routes uses the router information protocol (RIP). This protocol can be used to propagate changes in routes to be followed from the CCU 2 to the home agent 4 through the network. The propagation of route changes is triggered when the base station to which the CCU 2 is connected changes. It will however be appreciated that such propagation will take some time, and there is a danger that some data packets will be incorrectly routed. Furthermore, in such an arrangement a CCU is able to receive data from only a single base station at a particular point in time. Such an approach also suffers from problems from the point of view of scalability. Similar problems exist for other dynamic routing protocols, such as the Open Shortest Path First protocol (OSPF).

One method for routing response data packets from the home agent 4 to the CCU 2 requires modifying the header of each data packet sent by the CCU 2 at the NAT device of the base station at which that data packet is received. That is, the respective NAT devices of the base stations A to F are arranged to receive data packets from their respective wireless bridge and forward such data packets onwards over the network 3. As is well known, data packets often include a header including a first field identifying a source of the data packet and a second field identifying the destination of the data packet. Routinely, data packets generated by the CCU 2 will include within their headers data indicating the address of the CCU 2 as a source address.

In the present embodiment data packets received at the NAT devices are encapsulated Internet Protocol (IP) data packets. The IP data packets include a field indicating an IP address of a device from which the data packet emanated (i.e. the CCU 2). The NAT devices can be arranged to modify received data packets before the data packets are forwarded over the network 3, by modifying the source address within the data packets to identify the NAT device rather than the CCU 2. In this way, the home agent 4 receives data packets which appear (based upon their source address) to emanate from one of the NAT devices, not from the CCU.

When NAT devices are used in this way, the home agent 4, and indeed any other devices connected to the network 3 need not take any action to modify routes which data packets follow when the CCU 2 (i.e. one of the wireless bridges 8 to 11 of the CCU 2) connects to a different base station. Instead, upon receipt of a data packet the home agent 4 stores data indicating from which NAT device that data packet was received and forwards data packets intended for the CCU 2 to the indicated NAT device. In this case, however, problems may arise when the CCU 2 connects to a base station from which data packets have a relatively short round trip time (RTT) between the home agent 4 and that base station, from a base station from which data packets have a relatively long RTT between the home agent 4 and that base station.

Figure 3:
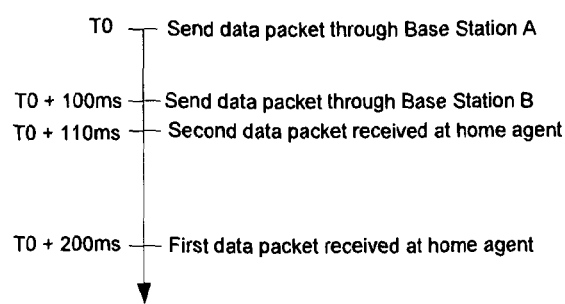
FIG. 3 is a timing diagram showing processing of data packets in known systems.

For example, as illustrated in FIG. 3, at time T0 the CCU 2 sends a data packet through base station A which, for the purposes of this example, has a RTT of 400 ms with the home agent 4 (i.e. it takes approximately 200 ms for a data packet to reach the home agent 4). The CCU 2 connects to, and sends a second data packet through base station B 100 ms later, the base station B having a RTT of 20 ms with the home agent 4. The home agent 4 receives the second data packet first at 110 ms after time T0, and updates its records to indicate that data packets should be sent to the CCU 2 via the second base station. However, 90 ms later at T0+200 ms, the home agent receives the first data packet and updates its records to indicate, incorrectly, that data packets should be sent to the CCU 2 via the first base station. That is, the method described above routes data packets based upon the order of receipt at the home agent 4, not order of transmission of data packets from base stations. It will be appreciated that this is problematic in that data packets transmitted from the home agent 4 may not be optimally routed.

Therefore, in some embodiments of the present invention, the CCU 2 is adapted to provide information in the encapsulated IP data packet to indicate which base station should be used to transmit data packets to the CCU 2. Further, each data packet sent by the CCU 2 is provided with a time stamp indicating when that data packet was transmitted. That is, each data packet emanating from the CCU 2 includes an identifier of a particular base station, a time stamp and an identifier of the CCU 2 within a header portion of that data packet. As described above, the home agent 4 maintains a record of which base station is associated with the CCU 2 at any particular time.

Figure 4:
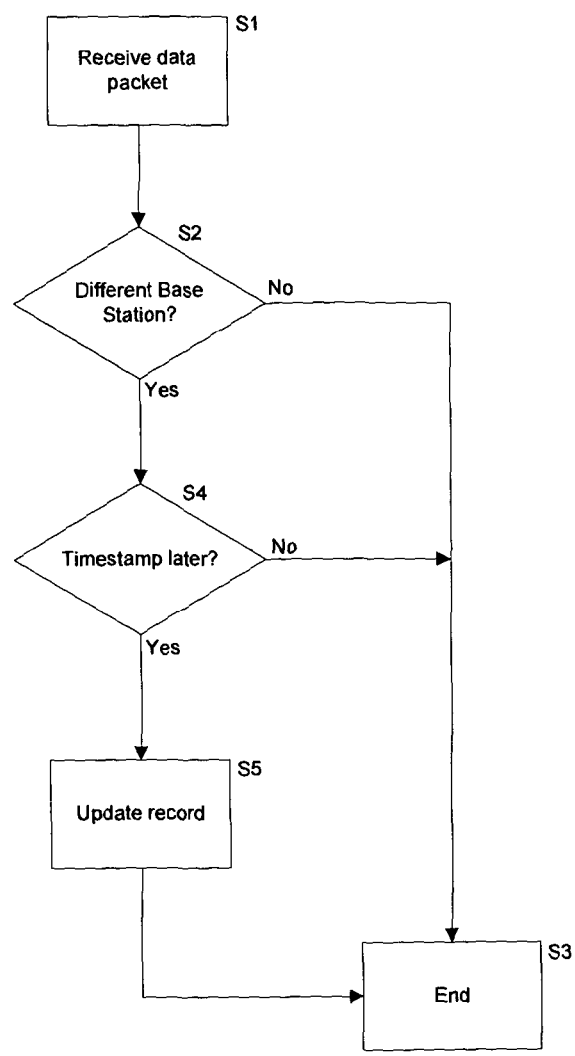
FIG. 4 is a flowchart showing processing carried out by a home agent of the network of FIG. 1 upon receipt of a data packet.

FIG. 4 shows the processing carried out at the home agent 4 to update data indicating which base station is associated with the CCU 2 at any particular time. At step S1 the home agent 4 receives a data packet from the CCU 2. At step S2 the home agent 4 determines if the base station indicated in the received data packet is different to the base station currently associated with the CCU 2. If it is determined that the base station indicated in the received data packet is the same as the base station currently associated with the CCU 2, processing ends at step S3.

If, on the other hand, it is determined that the base station indicated in the data packet is different to the base station currently associated with the CCU 2, processing passes to step S4. At step S4, it is determined whether the time stamp included in the received data packet is later than the time stamp of the last data packet which last caused the CCU 2 to be associated with a base station. If the time stamp of the received data packet is not later than the time stamp of the last data packet which caused the home agent 4 to update the base station association data for the CCU 2, processing ends at step S3. That is, if the time stamp of the received data packet is not later than the time stamp of the last received data packet to cause an update of the base station association data, it can be inferred that the currently recorded base station is the base station which the CCU 2 has most recently chosen to use.

If, on the other hand, the time stamp of the data packet is later than the time stamp associated with the last update operation, processing passes to step S5 at which the home agent 4 updates the base station association data for the CCU 2 indicate that data packets should be sent to the base station indicated in the received data packet. Processing passes from step S5 to end at step S3.

In some embodiments of the present invention, data packets sent and received from/to the CCU 2 are allocated to particular ones of the communication tunnels based upon the host 6*a*, 6*b* to which those data packets are destined or from which they are received. In further detail, client devices aboard the vehicle 1 send data packets to the CCU 2 for routing through a particular communication tunnel to hosts 6*a*, 6*b* connected to the Internet 5. For example, the host 6*a* may be a web server from which a client device requests a particular web page hosted by that web server. Each time a client device requests communication with a new host 6*a*, 6*b*, one of the four available communication tunnels is assigned to that host such that data packets sent to that host are sent via the assigned communication tunnel. The particular communication tunnel to use for communication with a new host 6*a*, 6*b* may be selected using any appropriate algorithm, for example the selection may be a round robin selection.

The CCU 2 maintains a routing table associating each communication tunnel with the hosts 6*a*, 6*b*. Further communications with hosts 6*a*, 6*b* by client devices aboard the vehicle 1 will use the communication tunnel associated with that host 6*a*, 6*b* in the routing table, irrespective of the wireless bridge 8 to 11 to which that communication tunnel is currently assigned.

In further embodiments of the present invention, data packets may be allocated to communication tunnels in any convenient way. For example, data packets may be allocated to communication tunnels on a per-packet basis. That is, for each data packet sent from the CCU 2, a respective communication tunnel may be selected to transmit that data packet to the home agent, the communication tunnel selection being based on, for example, round robin selection.

Figure 5:
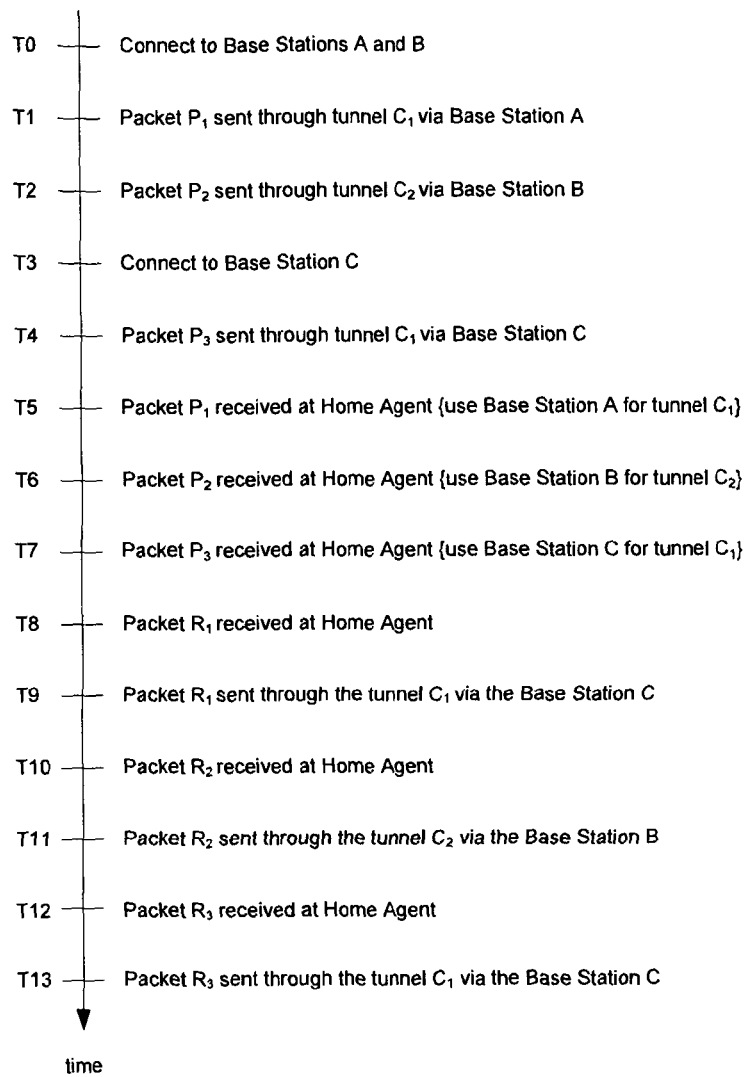
FIG. 5 is a timing diagram showing the processing of data packets in the network of FIG. 2.

FIG. 5 is a schematic illustration showing a transfer of data packets between the CCU 2 and the home agent 4 utilising two communication tunnels. It is to be understood that where the it is described below that communication tunnels the CCU 2 are allocated to base stations, this indicates that communication tunnels are allocated to wireless bridges of the CCU 2 which are currently connected to those base stations. In the example of FIG. 5, it should be understood that the CCU 2 has two available communication tunnels.

At time T0, the CCU 2 connects to the base stations A and B. A first communication tunnel $C_1$ is allocated to the base station A while a second communication tunnel $C_2$ is allocated to the base station B.

At time T1, a client device aboard the vehicle 1 and connected to the CCU 2 requests communication with the host 6*a* (for example, by requesting a web page from the host 6*a*). The address of the host 6*a* is associated with the communication tunnel $C_1$ (which association is added to the routing table maintained by the CCU 2) and a data packet $P_1$ is transmitted to the base station A for forwarding to the home agent 4, the data packet $P_1$ indicating that reply data packets should be sent via the base station A.

At time T2, a client device requests communication with the host 6*b*. The address of the host 6*b* is associated with the communication tunnel $C_2$ and a data packet $P_2$ is transmitted to the base station B for forwarding to the home agent 4, the data packet $P_2$ indicating that reply data packets should be sent via the base station B.

At time T3 the CCU 2 loses connection with the base station A and connects with the base station C. The tunnel $C_1$ is therefore allocated to the base station C. At time T4, a client device requests communication with the host 6*a*. The host 6*a* has been associated with the tunnel $C_1$ at the CCU 2 such that a data packet $P_3$ is transmitted to the base station C for forwarding to the home agent 4, the data packet $P_3$ indicating that reply data packets should be sent to the base station C.

At time T5, the data packet $P_1$ is received at the home agent 4. The home agent 4 examines the header of the data packet $P_1$ and updates its record to indicate that data packets sent through the communication tunnel $C_1$ should be sent via the base station A. The data packet $P_1$ is forwarded to the host 6*a*.

At time T6, the data packet $P_2$ is received at the home agent 4. The home agent 4 examines the header of the data packet $P_2$ and updates its record to indicate that data packets to be sent to the CCU 2 through the communication tunnel $C_2$ should be sent via the base station B. The data packet $P_2$ is forwarded to the host 6*b*.

At time T7, the home agent 4 receives the data packet $P_3$, and updates its record to indicate that data packets to be sent to the CCU 2 through the communication tunnel $C_1$ should be sent via the base station C. The data packet $P_3$ is forwarded to the host 6*a*.

At time T8, the home agent 4 receives a data packet $R_1$ from the host 6*a* in response to the data packet $P_1$, and determines from the routing table, that the data packet $R_1$ should be sent to the CCU 2 via the base station C, despite the data packet $P_1$ having been received at the home agent 4 from the base station A.

At time T9, the home agent 4 forwards the data packet $R_1$ to the CCU 2 through the tunnel $C_1$ via the base station C.

At time T10, the home agent receives a data packet $R_2$ in response to the data packet $P_2$ from the host 6*b*, and at time T11 forwards the data packet $R_2$ through the tunnel $C_2$ to the CCU 2 via the base station B.

At time T12, the home agent receives a data packet $R_3$ in response to the data packet $P_3$ from the host 6*a* and at time T13 forwards the data packet $R_3$ through the tunnel $C_1$ to the CCU 2 via the base station C.

Figure 6:
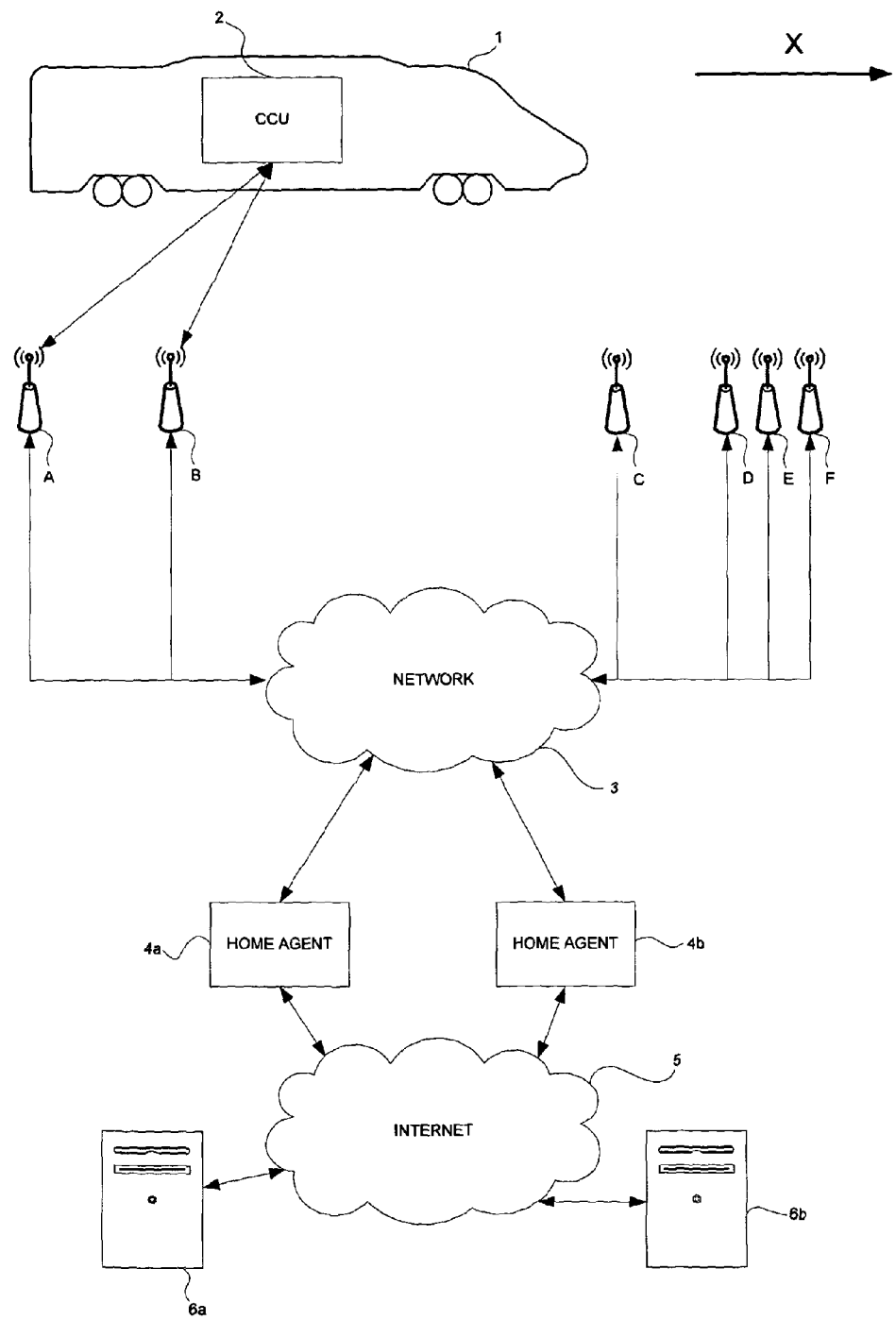
FIG. 6 is a schematic illustration showing the network of FIG. 1 with an additional home agent.
Figure 7:
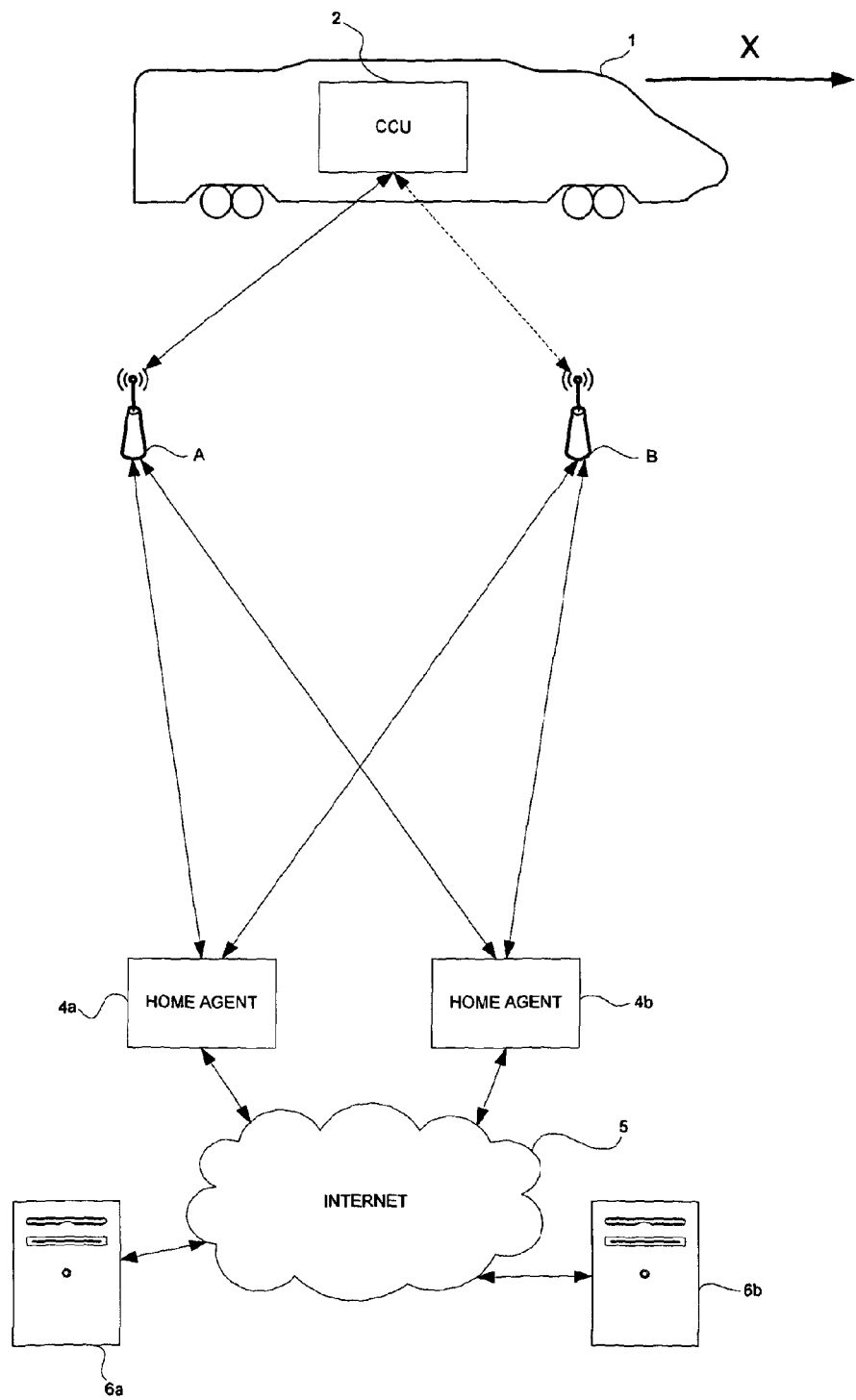
FIG. 7 is a schematic illustration showing part of the network of FIG. 5.

While the above described embodiment uses a single home agent 4, in other embodiments of the present invention, multiple home agents may be provided. In FIGS. 6 and 7, there is generally illustrated the network of FIG. 1 but having two home agents 4*a*, 4*b*. In the now described embodiments having two home agents, the CCU 2 establishes a respective communication tunnel between each communication interface of the CCU 2 which is connected to a base station and each of the home agents 4*a*, 4*b*. As such the CCU 2 establishes a number of communications tunnels the number being the product of the number of communication interfaces provided by the CCU 2 which is currently connected to a base station and the number of home agents 4a, 4b. The CCU 2 then chooses a tunnel to be used for communication at any particular time, as described below. In general terms, selection of a tunnel to be used for communication is based upon a round trip times between each communication interface (via a respective base station) and a respective home agent.

Figure 8:
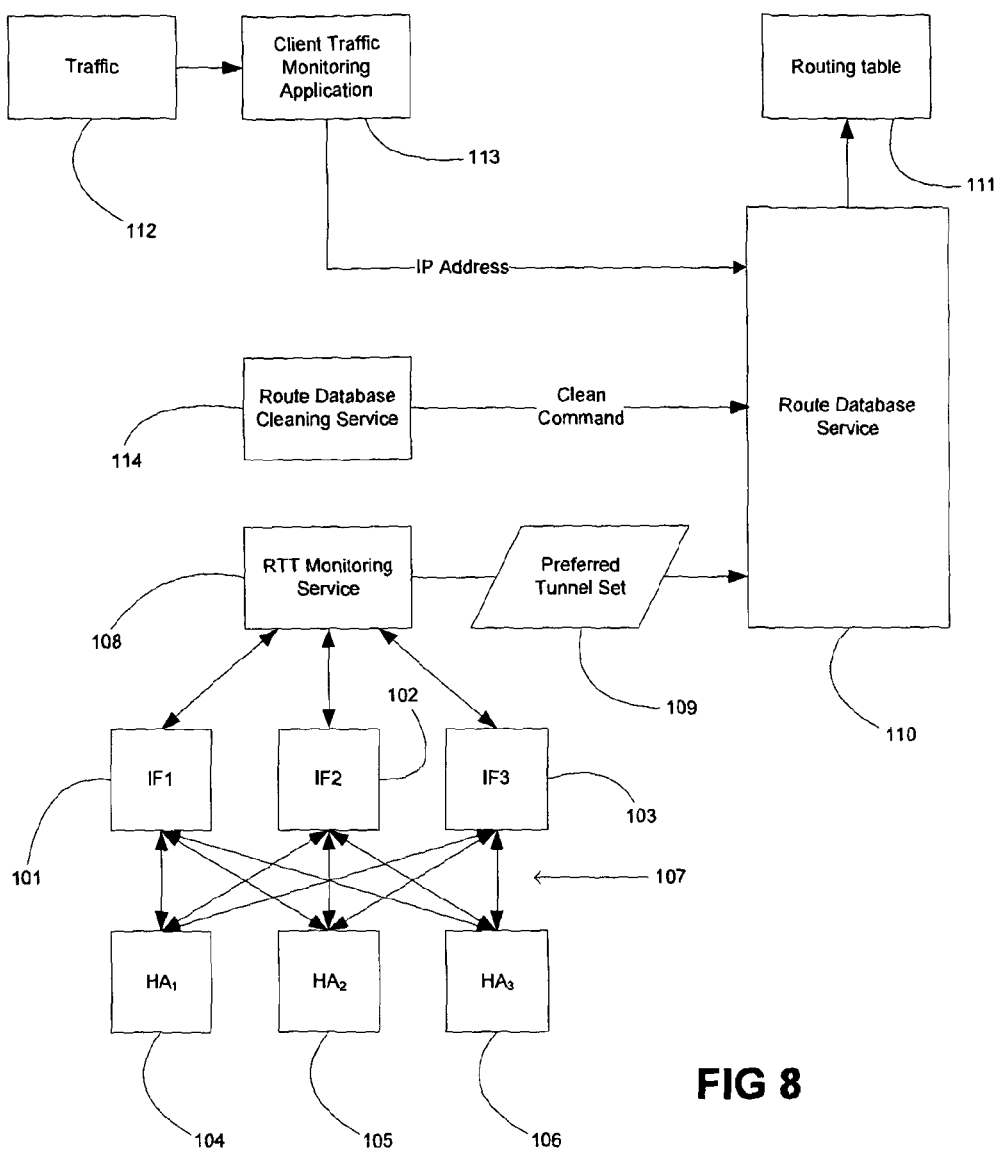
FIG. 8 is a schematic illustration of components used to determine communication tunnels used for particular communications.

FIG. 8 is a schematic illustration of components provided to ensure that data packets sent from the CCU 2 are transmitted over preferred communication tunnels. It can be seen that three communications interfaces 101, 102, 103 are provided by the CCU 2 and each of these interfaces establishes a connection with a respective base station. The CCU 2 is arranged to communicate with three home agents 104, 105, 106. As described above, this means that nine communication tunnels 107 are established, as shown in FIG. 8. It can be noted that each established communication tunnel 107 is associated with a particular communication interface 101, 102, 103, known as its home communication interface. It can further be noted that each communication interface 101, 102, 103 has associated with it as many communication tunnels as there are home agents 104, 105, 106. When a particular communication interface 101, 102, 103 is not connected to a base station, its associated communication tunnels are associated with others of the communication interfaces.

A monitoring service 108 monitors parameters associated with the communication tunnels 107. For example, the monitoring service 108 monitors a round trip time for each communication tunnel 107, being a time taken for a data packet to travel from one of the interfaces 101, 102, 103 to its respective home agent 104, 105, 106 and back to the respective interface 101, 102, 103. It will be appreciated that communication tunnels having a shorter round trip time are preferred. The monitoring service 108 provides a set of preferred communication tunnels 109 to a route database service 110. The route database service 110 populates a routing table 111 which is then used to appropriately route traffic 112 received at the CCU 2 which is to be forwarded to one of the home agents.

In more detail, traffic 112 is received at the CCU and processed with reference to entries in the routing table 111 to select a communication tunnel. Such routing may be based upon a destination IP address, such that all traffic destined for a particular destination IP address is sent over a common communication tunnel. This may be advantageous as out of order packets are avoided. However the routing table may be indexed in any convenient way, and as such routing may be based upon source or destination IP address, a combination of both, or any other convenient routing data.

As was described above, the monitoring service 108 provides a set of preferred communication tunnels 109 for use in routing to the route database service 110 which in turn populates the routing table 111. Where the routing table 111 does not include an entry associated with particular routing data (i.e. associated with a particular destination IP address), a traffic monitoring application 113 determines if the traffic is associated with a client device aboard the vehicle 1 (as opposed to administrative data, which may be destined for a particular home agent for example) and passes the routing data (i.e. the destination IP address) to the route database service 110. The route database service 110 is then configured to select a communication tunnel of the set of preferred communication tunnels 109 to be associated with that routing data, and to create an appropriate entry in the routing table 111 such that further traffic associated with that routing data is transmitted over the same communication tunnel.

It will be appreciated that, over time, the monitoring service 108 may modify the preferred tunnel set 109, as parameters associated with the communication tunnels vary. As such, the set of communication tunnels used to populate the routing table 111 may vary overtime.

Figure 9:
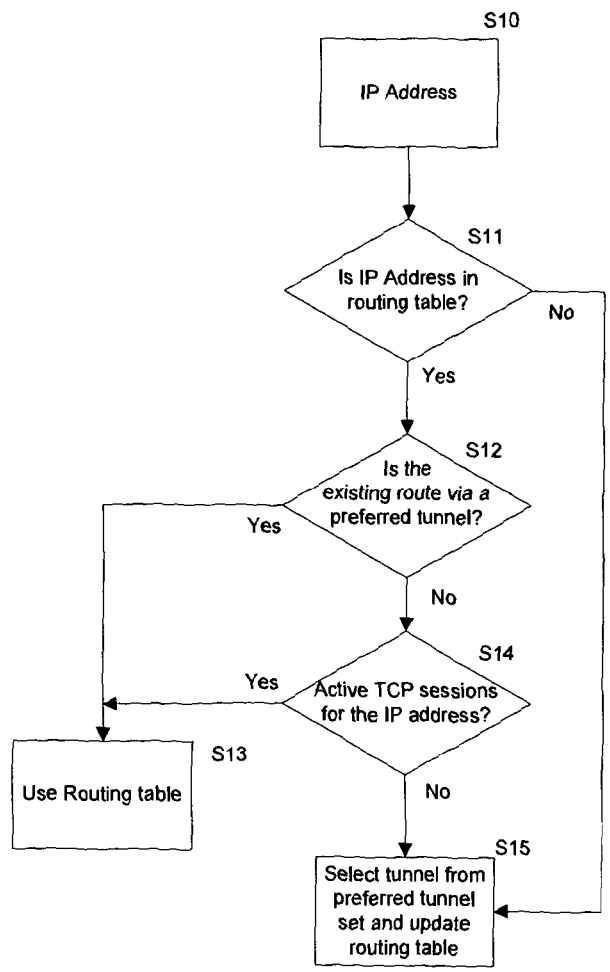
FIG. 9 is a flowchart of processing carried out by the components shown in FIG. 8.

Furthermore, it will be appreciated that where the routing table has been populated based upon a particular set of preferred communication tunnels, over time the routing table 111 may need to be updated. As such, when a look up operation is carried out using the routing table 111, the processing of FIG. 9 can usefully be carried out.

At step S10 a destination IP address is received for processing. At step S11 a check is carried out to determine whether the received IP address is included in the routing table 111. If the IP address is included in the routing table, processing passes to step S12 where a check is carried out to determine whether the communication tunnel specified in the routing table is one of the currently preferred communication tunnels 109. If this is the case, the communication tunnel specified in the routing table is used at step S13. If, however, the check of step S12 indicates that the tunnel specified in the routing table 111 is not a preferred communication tunnel, processing, processing passes to step S14 where a check is carried out to determine whether there are any active TCP sessions associated with the IP address. If it is the case that there are active TCP sessions associated with the IP address, the tunnel indicated in the routing table is used at step S13.

If the check of step S14 indicates that the tunnel indicated in the routing table is not currently in use, one of the preferred communication tunnels is selected, and the routing table is appropriately updated at step S15. Processing also passes from step S11 to step S15 when the IP address is not included in the routing table 111.

Where a communication tunnel is no longer preferred (in the sense that it is no longer included in the set of preferred communication tunnels 109), it may continue to be used for existing TCP sessions until either those sessions end, or a timeout occurs. A route database cleaning service 114 operates to ensure that, periodically, a clean command is used to prevent the continued use of non-preferred communication tunnels. This is achieved by enforcing a maximum lifetime on TCP sessions (e.g. 1 hour) after which time TCP sessions are closed, thereby ensuring that overly long TCP sessions do not continue to maintain non-preferred communication tunnels in use.

In some embodiments of the present invention, multiple routing tables 111 may be provided. For example, it may be desirable to specify a plurality of classes of traffic, where the determination of preferred communication tunnels is different for each class of traffic. In this case, respective, corresponding route database services 110 are provided for each of the routing tables 111, each operating as described above. Where multiple routing tables 111 and multiple route database services 110 are provided, the client traffic monitoring application 113 determines to which class particular traffic belongs, and passes routing data to the appropriate route database service 110 to update the appropriate routing table 111.

It will be appreciated that the particular components of FIG. 8 are merely exemplary, and functionality performed by particular components may be performed by multiple components, or the functionality of several components may be performed by a single component. For example, the functionality of the client traffic monitoring application 113 and the route database cleaning service 114 may be performed by the route database service 110. Similarly, rather than modifying an external routing table 111, the route database service 110 may maintain an internal routing table and use this to determine the home agent to which client traffic is to be forwarded.

Referring back to FIGS. 6 and 7, before establishment of a communication tunnel between the CCU 2 and a home agent 4a, 4b, the CCU 2 and the home agent 4a, 4b communicate, for example using TCP, to determine the appropriate attributes of the communication tunnel to be established. It will be appreciated that the attributes of the communication tunnel may depend upon a number of factors including the networks over which the communication tunnel is provided and the requirements for use of the communication tunnel. Example attributes agreed by the CCU 2 and the home agent may include an encryption algorithm for use in encrypting data packets transmitted via the communicate tunnel, a compression factor for data transmitted via the communication tunnel and a maximum transmission unit (MTU) size.

Referring to FIG. 2, it was explained that the wireless bridges 8 to 11 on board the train 1 are connected to a router 9. These wireless bridges are Layer 2 devices. To prevent problems, such as broadcast storms, arising from bridging loops between the CCU and the base stations, each bridge is separated from each other bridge by means of Layer 3 devices, such that each Layer 2 bridge is only accessible via a separate IP address. The separation of Layer 2 devices may be achieved by any appropriate means, such as the use of port based virtual LANs, or by connecting each bridge through individual, physical Ethernet ports. Additionally or alternatively, bridging loops may be controlled by the use of appropriate filtering between ports of the Layer 2 devices.

It was further explained that each of the wireless bridges 8, 9 operate on a different frequency, and that each base station A, B contain a wireless bridge arranged to operate on corresponding frequencies. Such an arrangement helps to ensure that data packets sent between the CCU and the base stations follow the correct wireless path. Furthermore, where switches are used to direct data packets it is advantageous to use managed switches as these allow more control over Layer 2 traffic.

It will be appreciated that the base stations A to F provide wireless communication to the CCU 2. A variety of different base stations can be used in embodiments of the invention. Any base station not having network address translation capability can be provided with an associated device providing such capability for use in some embodiments of the present invention. From the preceding discussion it can be seen that where NAT devices are used each device providing network address translation capability need have its own unique IP address.

CCUs of different trains have unique IP addresses, and each of the wireless bridges associated with a CCU has a different IP address. However the addresses of the wireless bridges associated with a CCU need not be unique amongst a plurality of CCUs.

In the preceding description it has been explained that the CCU 2 connects to base stations A to F. These base stations can conveniently be provided at the side of a track along which the train travels. In alternative embodiments of the invention the CCU 2 may be configured to communicate with base stations associated with respective mobile telephone networks such that the CCU 2 is configured to connect to different mobile telephone networks as the train moves. Similarly, the CCU 2 can be adapted for connection to satellite networks.

It has been explained in the preceding description that the CCU 2 is arranged to provide wireless network connectivity onboard the train 1 such that passengers travelling on the train 1 can use mobile computing devices to connect to the CCU 2. It will be appreciated that in some embodiments of the invention the CCU 2 is not adapted to provide wireless network connectivity onboard the train. Such embodiments can be useful in providing, for example, telemetry services and closed circuit television.

The preceding description has been concerned with an embodiment in which the CCU 2 is associated with a train. It will be appreciated that the methods described herein are in no way limited to trains, but are instead widely applicable to any situation in which data communication is provided to a moving person or object. In particular, the methods described can be used to provide data communication to other vehicles (e.g. busses and cars).

The invention claimed is:

1. A method of providing communication to a first device aboard a vehicle, the method comprising:
    establishing a first connection between a first communication interface of the first device and a first one of a plurality of second devices;
    establishing a plurality of virtual connections, each virtual connection being between the first communication interface of said first device and one of a plurality of third devices through the first one of said second devices, wherein the first communication interface of the first device has an established virtual connection to each of the third devices, and wherein each of the third devices is adapted to provide communication between the first device and a predetermined network;
    selecting a first one of the plurality of third devices for communication with the predetermined network by selecting one or more of said virtual connections based upon data indicating characteristics of said virtual connections;
    establishing, in response to a movement of the vehicle, a second connection between a second communication interface of the first device and a second one of the plurality of second devices, wherein the second one of the plurality of second devices is different from the first one of the plurality of second devices; and
    in response to establishing the second connection and in response to disconnection of the first connection, allocating the plurality of the virtual connections to the second one of said second devices, and selecting a second one of the plurality of third devices for communication with the predetermined network by selecting one or more of said allocated virtual connections based upon data indicating characteristics of said allocated virtual connections.

2. A method according to claim 1, wherein said characteristics of said virtual connections comprise a parameter associated with communication using said virtual connections.

3. A method according to claim 2, wherein said parameter is indicative of properties of a link between one of said second devices and one of said third devices.

4. A method according to claim 1, wherein said data provides an indication of a round trip time for data sent using each of said virtual connections.

5. A method according to claim 1, wherein each of said virtual connections is a communication tunnel.

6. A method according to claim 1, further comprising storing a routing table comprising a plurality of entries, each entry associating particular routing data with a particular virtual connection.

7. A method according to claim 6, further comprising:
receiving a data packet comprising routing data; and
processing said received data packet with reference to said routing table to obtain a virtual connection associated with said routing data.

8. A method according to claim 7, further comprising:
determining whether said obtained virtual connection is one of said one or more selected virtual connections.

9. A method according to claim 8, wherein, if said obtained virtual connection is not one of said one or more selected virtual connections, obtaining another virtual connection to be associated with the routing data, the another virtual connection being one of said one or more selected virtual connections.

10. A method according to claim 9, wherein the another virtual connection is obtained if but only if there is no active TCP session associated with the routing data.

11. A method according to claim 10, further comprising terminating use of a particular virtual connection if a time out time is reached.

12. A method according to claim 1, wherein said first device is arranged to receive data packets from client devices.

13. A method according to claim 12, wherein said first device is arranged to wirelessly receive data packets from client devices.

14. A non-transitory computer readable medium carrying a computer program configured to cause a computer to carry out a method according to claim 1.

15. A computer apparatus for providing communication to a first device, the apparatus comprising:
a memory storing processor readable instructions; and
a processor arranged to read and execute instructions stored in said memory,
wherein said processor readable instructions are arranged to control the computer to carry out a method according to claim 1.

16. Apparatus for providing communication to a first device aboard a vehicle, the apparatus comprising:
means for establishing a first connection between a first communication interface of the first device and a first one of a plurality of second devices;
means for establishing a plurality of virtual connections, each virtual connection being between the first communication interface of said first device and one of a plurality of third devices through the first one of said second devices, wherein the first communication interface of the first device has an established virtual connection to each of the third devices, and wherein each of the third devices is adapted to provide communication between the first device and a predetermined network;
means for selecting a first one of the plurality of third devices for communication with the predetermined network by selecting one or more of said virtual connections based upon data indicating characteristics of said virtual connections;
means for establishing, in response to a movement of the vehicle, a second connection between a second communication interface of the first device and a second one of the plurality of second devices, wherein the second one of the plurality of the second devices is different from the first one of the plurality of second devices; and
means for, in response to establishing the second connection and in response to disconnection of the first connection, allocating the plurality of virtual connections to the second one of said second devices, and means for selecting a second one of the plurality of third devices for communication with the predetermined network by selecting one or more of said allocated virtual connections based upon data indicating characteristics of said allocated virtual connections.

* * * * *